UNITED STATES PATENT OFFICE 2,687,427

HALOGEN-CONTAINING POLYCARBOXYLATES

Joseph E. Fields, Dayton, Ohio, assignor to Monsanto Chemical Company, St. Louis, Mo., a corporation of Delaware No Drawing. Application December 29, 1950,
Serial No. 203,537

12 Claims. (Cl. 260—485)

The present invention relates to polyhalogenated organic compounds and provides new tri- and tetra-halogenated esters and a method of producing the same.

According to the invention there are provided new and highly valuable liquids, having an average molecular weight of less than 15,000 and comprising mixtures of halogen-containing polycarboxylates prepared by the free-radical-catalyzed addition of certain polyhalomethanes and mixtures of certain alkyl or alkoxyalkyl esters of acrylic or methacrylic acid and certain dialkyl esters of α,β-unsaturated dicarboxylic acids. The reaction is one of simple addition in which one mole of the halomethane compound adds to the mixture of esters substantially according to the scheme:

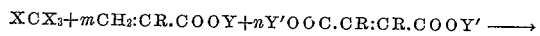

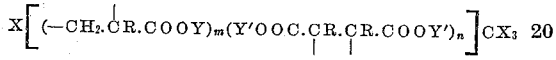

in which X is selected from the group consisting of hydrogen, chlorine and bromine and in which only one X is hydrogen in a single compound, $m$ and $n$ are integers of at least 2, R is selected from the class consisting of hydrogen and the methyl radical, and Y and Y' are selected from the class consisting of alkyl and alkoxyalkyl radicals of from 1 to 8 carbon atoms.

Polyhalomethanes suitable for the present purpose are, e. g., carbon tetrachloride, carbon tetrabromide, chloroform, bromoform, bromotrichloromethane, chlorotribromomethane, dichlorodibromomethane, etc. Alkyl or alkoxyalkyl esters of acrylic or methacrylic acid which may be employed include, e. g., methyl, ethyl, propyl, isopropyl, butyl, isobutyl, sec-butyl, tert-butyl, amyl, isoamyl, tert-amyl, sec-amyl, hexyl, heptyl, 2-ethylhexyl or octyl acrylate or methacrylate and methoxyethyl, 2-ethoxyethyl, 2-ethoxypropyl, 4-butoxybutyl and 2-hexyloxyethyl acrylate or methacrylate. Dialkyl or bis(alkoxyalkyl) esters of α,β-unsaturated dicarboxylic acids which may be employed are dialkyl or bis(alkoxyalkyl) maleates, fumarates, mesaconates, citraconates or dimethylmaleates in which each alkyl radical or alkoxyalkyl radical has from 1 to 8 carbon atoms. The proportions of monocarboxylates and dicarboxylates employed in the original mixture of esters employed for the addition reaction with the polyhalomethane may be widely varied, e. g., the mixture may contain from 1% to 99% of the acrylate or methacrylate and from 99% to 1% of the dicarboxylate, depending upon the average molecular composition desired in the final product. Adducts may be obtained by reacting one of the present halomethanes with, e. g., a mixture of equal amounts of ethyl acrylate and di-n-butyl fumarate, whereby there are formed addition products having recurring ethyl carboxylate and di-n-butyl dicarboxylate units.

One class of compounds having the above general formula includes adducts of carbon tetrachloride or chloroform with an alkyl acrylate and a dialkyl maleate or fumarate:

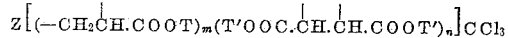

in which Z is selected from the class consisting of hydrogen and chlorine, T and T' are alkyl radicals of from 1 to 8 carbon atoms and $m$ and $n$ are integers of at least 2. Adducts having this formula are easily obtainable from readily available raw materials. Those in which the alkyl radical has from 2 to 8 carbon atoms are particularly valuable as antifoaming agents for hydrocarbon oils. Such adducts generally have a molecular weight of at least 2,000 but not more than 10,000. As disclosed in my copending application Serial No. 202,434 filed December 22, 1950, now abandoned, the present halomethane-carboxylate-dicarboxylate adducts having a molecular weight of from 2,000 to 10,000 and preferably of from 3,000 to 7,000 possess the property of reducing or completely inhibiting formation of foam or froth in base stock or compounded hydrocarbon oils.

The present adducts are readily obtainable by contacting the halomethane compound with the mixture of esters at ordinary or increased temperatures in the presence of a free-radical-liberating agent as catalyst until formation of adducts having the desired viscosity characteristics has taken place. The reaction may be effected by mixing together the halomethane, esters and catalyst and maintaining the resulting mixture, advantageously with agitation, at a temperature which permits steady decomposition of the catalyst and consequent steady liberation of halomethyl free-radicals. Or, if desired, the mixture of esters may be added gradually, e. g., dropwise, to the halomethane, while constantly maintaining an optimum quantity of active catalyst in the reaction zone, which zone is preferably kept at a temperature conducive to the formation of free-radicals. Depending upon the nature of the individual reactants and catalyst and the properties desired in the final product, increased temperatures, e. g., temperatures of from above room temperature to about 125° C., may be generally employed. The reaction time may vary from, say, several hours to several days. Substantially equimolar quantities of the halomethane and the mixture of ester may be used; however, for the production, in good yields, of adducts having an average molecular weight of less than 15,000, an excess of the halomethane is preferred. An excess of the esters is not recommended. Variation of catalyst quantity has been found to have a definite effect on the nature of the adduct. While catalyst quantities of up to 10% based on the weight of the esters may be used, I have found that generally a catalyst range of from 0.1% to 5% is preferable. The use of the greater proportions of catalyst within this range tends to favor formation of the lower molecular weight adducts, and the use of lower quantities of catalyst tends to favor formation of the high molecular-weight adducts, i. e., adducts having a molecular-weight of from, say, 7,000 to 15,000. The average molecular-weight of the adducts is also influenced by other variables, e. g., ratio of esters to halomethane and temperature, etc.

Formation of the present adducts probably proceeds through a chain mechanism, with termination of the chain at an early stage. Depending upon the nature and the quantity of the reactants and of the free-radical-liberating agent, as well as upon the reaction conditions, chain propagation may be terminated at various stages to yield products having an average molecular-weight of less than 15,000.

An extraneous, inert solvent or diluent, e. g., benzene or hexane may be employed, either to serve as catalyst solvent, to mitigate reaction heat, or to dilute the concentration of the ester in the reaction mixture. The use of such a solvent or diluent, however, is generally of little economic advantage.

Free-radical-liberating agents which may be employed in promoting addition of the present mixture of monocarboxylates and dicarboxylates to the polyhalomethanes are compounds which will recompose to give free-radicals. Such compounds include peroxygen-type catalysts, as for example, acyl peroxides such as acetyl, benzoyl, lauroyl or stearoyl peroxides; hydrocarbon peroxides or hydroperoxides such as di-tert-butyl peroxide, di-tert-amyl peroxide, tert-butyl hydroperoxide, cumene hydroperoxide or p-cymene hydroperoxide; and inorganic per-compounds such as hydrogen peroxide, sodium peroxide, sodium perborate, potassium persulfate, and alkali percarbonates; hydrazine derivatives such as hydrazine hydrochloride and dibenzoyl hydrazine; organometallic compounds such as tetra-ethyl lead, etc. For convenience, the peroxygen type catalysts will be hereinafter referred to as peroxidic compounds. Only catalytic quantities of the free-radical-liberating agent need be employed in promoting the addition reaction. Ultra-violet light may be employed with the catalyst or as the sole catalytic agent.

The present adducts differ essentially from polymeric acrylates or methacrylates previously obtained or from other polymeric carboxylates in that they are halogen-containing, low-molecular weight materials, i. e., the average molecular-weight of the present adducts is less than 15,000 and in that they are viscous liquids rather than solid or semi-solid materials. The present adducts differ most significantly from prior polyacrylates or polymethacrylates in that the present materials impart foam-inhibiting properties to hydrocarbon oils, whereas the prior polymeric esters are known to increase foam-susceptibility to hydrocarbon oils.

The invention is further illustrated, but not limited, by the following examples.

*Example 1*

This example shows the preparation of adducts of carbon tetrachloride and mixtures of n-butyl or n-amyl acrylate and di-n-butyl maleate, employing benzoyl peroxide as catalyst. The reaction was effected by mixing one mole (154 g.) of carbon tetrachloride with the quantities of esters and catalyst indicated in the table below and maintaining flasks of the resulting mixtures on a rotating rack at 43 R. P. M. at a temperature of from 90–95° C. for 48 hours. At the end of that time unreacted material was removed by distilling through a 10" Vigreux column. The residues were adducts having the chlorine-content and molecular-weight shown in the table below:

| Expt. No. | Reactants | Product G. | Percent Cl | M. W. |
|---|---|---|---|---|
| 1 | n-Butyl acrylate, 27 g. (.215 mole); Maleate, 3 g. (.0138 mole); Catalyst, 1.5 g. (5%). | 31.3 | 4.12 | 3,450 |
| 2 | n-Butyl acrylate, 24 g. (.187 mole); Maleate, 6 g. (.0262 mole); Catalyst 1.5 g. (5%). | 31.6 | 4.62 | 3,070 |
| 3 | n-Butyl acrylate, 21 g. (.164 mole); Maleate, 9 g. (.0395 mole); Catalyst, 1.5 g. (5%). | 31.3 | 4.54 | 3,130 |
| 4 | n-Butyl acrylate, 18 g. (.141 mole); Maleate, 12 g. (.1525 mole); Catalyst, 1.5 g. (5%). | 31.3 | 4.54 | 3,130 |
| 5 | n-Butyl acrylate, 15 g.; Maleate, 15 g.; Catalyst, 0.6 g. (2%). | 21.0 | 3.15 | 4,500 |
| 6 | Amyl acrylate, 18 g.; Maleate, 12 g.; Catalyst, 0.6 g. (2%). | 23.0 | 2.60 | 5,450 |

*Example 2*

This example shows addition of carbon tetrachloride or chloroform to mixtures of diethyl fumarate and n-butyl acrylate in the presence of benzoyl peroxide as catalyst. The reactions were effected as in Example 1, except that the reaction time for Experiments 5, 6 and 7 below was 26 hours instead of 48 hours.

| Expt. No. | Reactants | Product G. | Percent Cl | M. W. |
|---|---|---|---|---|
| 1 | Acrylate, 30.7 g. (.24 mole); Fumarate, 10.3 g. (.06 mole); CCl₄, 138.3 g. (0.9 mole); Catalyst, 0.4844 g. (0.002 mole). | 40.5 | 1.53 | 9,270 |
| 2 | Acrylate, 30.7 g. (.24 mole); Fumarate, 10.3 g. (.06 mole); CHCl₃, 107.3 g. (0.9 mole); Catalyst, 0.4844 g. (0.002 mole). | 40.8 | 1.21 | 8,790 |
| 3 | Acrylate, 19.2 g. (.15 mole); Fumarate, 25.8 g. (.15 mole); CCl₄, 138.3 g. (.9 mole); Catalyst, 0.4844 g. (.002 mole). | 39.1 | 1.34 | 10,500 |
| 4 | Acrylate, 19.2 g. (.24 mole); Fumarate, 25.8 g. (.15 mole); CHCl₃, 107.3 g. (.9 mole); Catalyst, 0.4844 g. (.002 mole). | 35.4 | 0.81 | 13,100 |
| 5 | Acrylate, 30.7 g. (.24 mole); Fumarate, 10.3 g. (.06 mole); CCl₄, 138.3 g. (.9 mole); Catalyst, 2.05 g. (.0085 mole). | 42.2 | 2.87 | 4,940 |
| 6 | Acrylate, 30.7 g. (.24 mole); Fumarate, 10.3 g. (.06 mole); CHCl₃, 107.3 g. (.9 mole); Catalyst, 2.05 g. (.0085 mole). | 41.6 | 2.75 | 3,870 |
| 7 | Acrylate, 19.2 g. (.15 mole); Fumarate, 25.8 g. (.15 mole); CCl₄, 138.3 g. (.9 mole); Catalyst, 2.05 g. (.0085 mole). | 44.5 | 1.99 | 7,130 |

Operating as in the above examples other trior tetra-halomethanes may be similarly reacted with mixtures of alkyl acrylates or methacrylates and dialkyl maleates or fumarates to yield adducts, having an average molecular weight of below 15,000. Also instead of using the alkyl esters, there may be used alkoxyalkyl esters of acrylic or methacrylic acid and/or bis (alkoxyalkyl)-esters of the dicarboxylic acids, e. g., bis(2-ethoxyethyl) maleate. Instead of employing benzoyl peroxide as catalyst other peroxidic compounds or other free-radical liberating agents may be used as catalysts.

While the present adducts are very advantageously used as anti-foaming inhibitors for hydrocarbon oils, they may be also employed for a variety of other industrial purposes, e. g., as plasticizers for natural or synthetic resins and plastics, as heat-transfer media, dielectric fluids, etc.

What I claim is:

1. A liquid, having an average molecular weight of less than 15,000, and comprising a mixture of adducts having the formula:

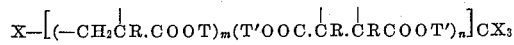

in which X is selected from the class consisting of hydrogen, chlorine and bromine and in which only one X is hydrogen, R is selected from the class consisting of hydrogen and the methyl radical, T and T' are alkyl radicals of from 1 to 8 carbon atoms and $m$ and $n$ are integers of at least 2.

2. A liquid, having a molecular weight of less than 15,000 and comprising a mixture of adducts having the formula:

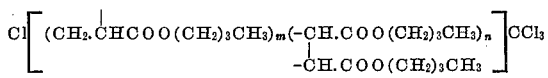

in which $m$ and $n$ are integers of at least 2.

3. A liquid, having a molecular weight of less than 15,000, and comprising a mixture of adducts having the formula:

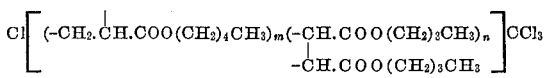

in which $m$ and $n$ are integers of at least 2.

4. A liquid, having an average molecular weight of less than 15,000, and comprising a mixture of adducts having the formula:

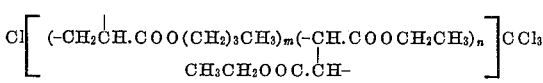

in which $m$ and $n$ are integers of at least 2.

5. A liquid, having an average molecular weight of less than 15,000, and comprising a mixture of adducts having the formula:

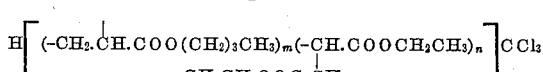

in which $m$ and $n$ are integers of at least 2.

6. The method which comprises contacting, in the presence of a free-radical liberating agent, a polyhalomethane compound having the general formula:

in which X is selected from the class consisting of hydrogen, chlorine and bromine and in which only one X is hydrogen in a single compound, with a mixture of a monocarboxylate having the general formula:

in which R is selected from the class consisting of hydrogen and the methyl radical and T is an alkyl radical of from 1 to 8 carbon atoms and a dicarboxylate having the general formula:

in which R is selected from the class consisting of hydrogen and the methyl radical and T' is an alkyl radical of from 1 to 8 carbon atoms and recovering from the resulting reaction product a liquid, having an average molecular weight of less than 15,000, and comprising a mixture of adducts in which one mole of said polyhalomethane has combined with at least two moles of the monocarboxylate and at least two moles of the dicarboxylate.

7. The method which comprises contacting carbon tetrachloride, in the presence of a free-radical-liberating agent, with a mixture of at least two moles of n-butyl acrylate and at least two moles of di-n-butyl maleate, and recovering from the resulting reaction product a liquid, having an average molecular weight of less than 15,000, and comprising a mixture of adducts in which one mole of the carbon tetrachloride has combined with at least two moles of said acrylate and at least two moles of said maleate.

8. The method which comprises contacting carbon tetrachloride, in the presence of a free-radical-liberating agent, with a mixture of at least two moles of amyl acrylate and at least two moles of di-n-butyl maleate, and recovering from the resulting reaction product a liquid, having an average molecular weight of less than 15,000 and comprising a mixture of adducts in which one mole of the carbon tetrachloride has combined with at least two moles of said acrylate and at least two moles of said maleate.

9. The method which comprises contacting carbon tetrachloride in the presence of a free-radical-liberating agent, with a mixture of at least two moles of n-butyl acrylate and at least two moles of diethyl fumarate, and recovering from the resulting reaction product a liqiud, having an average molecular weight of less than 15,000, and comprising a mixture of adducts in which one mole of the carbon tetrachloride has combined with at least two moles of said acrylate and at least two moles of said fumarate.

10. The method which comprises contacting chloroform in the presence of a free-radical-liberating agent, with a mixture of at least two moles of n-butyl acrylate and at least two moles of di-n-butyl maleate, and recovering from the resulting reaction product a liquid, having an average molecular weight of less than 15,000, and comprising a mixture of adducts in which one mole of the chloroform has combined with at least two moles of said acrylate and at least two moles of said maleate.

11. The method which comprises contacting carbon tetrachloride, in the presence of a free-radical-liberating agent with a mixture of an alkyl acrylate in which each alkyl radical has from 1 to 8 carbon atoms and a dialkyl maleate in which each alkyl radical has from 1 to 8 carbon atoms, and recovering from the resulting reaction product a liquid, having an average molecular weight of less than 15,000, and comprising a mixture of adducts in which one mole of the carbon tetrachloride has combined with at least two moles of the acrylate and at least two moles of the maleate.

12. The method which comprises contacting carbon tetrachloride, in the presence of a free-radical-liberating agent with a mixture of an alkyl acrylate in which each alkyl radical has from 1 to 8 carbon atoms and a dialkyl fumarate in which each alkyl radical has from 1 to 8 carbon atoms, and recovering from the resulting reaction product a liquid, having an average molecular weight of less than 15,000, and comprising a mixture of adducts in which one mole of the carbon tetrachloride has combined with at least two moles of the acrylate and at least two moles of the fumarate.

References Cited in the file of this patent

UNITED STATES PATENTS

| Number | Name | Date |
|---|---|---|
| 2,440,800 | Hanford | May 4, 1948 |
| 2,492,170 | Mast et al. | Dec. 27, 1949 |

OTHER REFERENCES

Smith, J. Amer. Chem Soc., vol. 68, pp. 2059-2064 (1946).

Smets et al., Bull. Soc. Chim. Belg., vol. 56, pp. 159-179 1947).